Aug. 12, 1952 W. R. COLLINGS 2,606,510
COOKING UTENSIL, ITS METHOD OF PREPARATION, AND
THE BAKING OF BREAD THEREIN
Filed Jan. 28, 1947
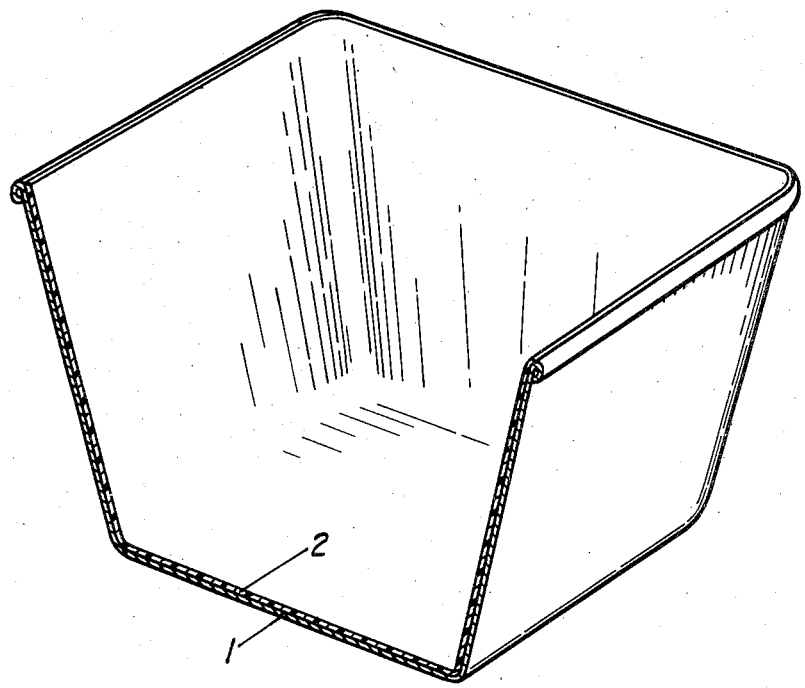
INVENTOR.
WILLIAM R. COLLINGS
BY Robert F. Fleming Jr.
ATTORNEY Patented Aug. 12, 1952

2,606,510

UNITED STATES PATENT OFFICE 2,606,510

COOKING UTENSIL, ITS METHOD OF PREPARATION, AND THE BAKING OF BREAD THEREIN

William R. Collings, Midland, Mich., assignor to Dow Corning Corporation, Midland, Mich., a corporation of Michigan Application January 28, 1947, Serial No. 724,929

9 Claims. (Cl. 107—54)

The present invention relates to the art of baking bread and has particular reference to methods for the preparation of pans in which bread is baked and to methods for the baking of bread.

Bread baking is an art centuries old. Considerable progress has been made in recent years in this art. Despite the recent progress, certain of the methods which have been employed for many years are considered to be essential in the operation. One of these essential operations is the greasing of the bread pans. The greasing of pans is not only costly from the aspect of labor and material but is a messy operation which makes it almost impossible for the operators to keep their clothes and gloves clean. Inasmuch as the grease is normally applied with a brush whether the greasing is done by hand or by a machine, frequently bristles remain in the pan which are baked into the surface of the bread. In baking, the hot grease fouls the oven and makes an unpleasant odor. During baking the grease carbonizes. This causes blackened areas on the bottoms of the loaves of bread, and makes it necessary to have the pans cleaned frequently. Notwithstanding the use of considerable amounts of grease, the bread normally sticks in some of the pans, making it necessary to bank the pans in order to free the bread. More important than the waste of time involved in such an operation is the damage to the pans themselves. While this may sound like a rather crude operation for the present day, it is in fact the actual present status of the baking industry, and is accepted as a necessary incident to the baking of bread.

The baking industry experienced its principal mechanical growth in the period from 1920 to 1929. Substantial improvements in the mechanization of bakeries have occurred since that time. Full mechanization of bakeries has been impossible in the handling of bread following the baking operation. Manual operation has been necessary due to variation in the release of bread from the pans. Mechanization of this portion of the bakery can be complete only when it is possible to obtain consistent and ready release of the bread from the pans.

Objects of the present invention are to avoid the shortcomings of pan greasing in the baking of bread, to provide methods for preparing bread pans which eliminate the necessity of greasing, to provide improved release of bread from baking pans, and to make possible the full mechanization of bakeries.

In accordance with the present invention, bread pans are coated internally with an organosiloxane resin. Following coating of the pans with the resin, the pans are heated at a temperature above 350° F. to cure the resin. Bread may then be baked repeatedly in the pan so treated without the necessity of retreatment or of greasing the pan.

One embodiment of this invention is shown in the drawing. The drawing is a sectional view of a bread pan 1 coated on the inner side with an organosiloxane resin 2.

Organosiloxane resins suitable for the present purpose have heretofore been described and are available commercially. These resins are polymers in which the polymer units are as follows: $SiO_2$, $RSiO_{1.5}$, $R_2SiO$ and $R_3SiO_{0.5}$. In the above type formulae R represents a monovalent hydrocarbon radical which, as is known, may be of considerably diverse character. Thus the hydrocarbon radicals may be alkyl, aryl, aralkyl or alkaryl radicals. The siloxane polymers which contain these units differ markedly in their properties. This variation in properties is dependent primarily upon the average degree of substitution in the polymer. The resins which are of utility for the present purpose are those which contain between 0.95 and 1.6 hydrocarbon radicals per silicon atom. Preferred resins are those in which the hydrocarbon radicals are alkyls containing less than 4 carbon atoms and phenyls and in which at least 40% of the siloxane units are of the type $RSiO_{1.5}$.

The pans to which the resin is applied should be clean in order to obtain the best results. In case the pans are new, the temporary coating should be burned off in accordance with customary bakery practice. If used pans are to be employed, they should be cleaned of all grease and flour. Conventional bakery cleaning practice is satisfactory for this purpose. It is desirable for the pans to be relatively free of fingerprints at the time of coating with the resin.

The pans are then coated with a solution of the organosiloxane resin. Coating may be effected by spraying, brushing or dipping. Any excess resin is drained from the pans and the pans are then dried. The pans which then carry a resin coating on their internal surfaces are then heated to cure the resin at a temperature of at least 350° F. for at least 15 minutes. The degree of cure may be increased by heating at a higher temperature, or for a longer time or by the inclusion of a catalyst in the resin.

The pans so prepared which carry a film of cured resin are then ready for the baking operation. The loaf to be baked is placed in the pan without greasing of the pan. After baking the loaf can be turned out of the pan which is then ready for another loaf. No banging on the pan is necessary to loosen the baked bread loaves.

Commercial bread pans were coated with a siloxane resin. The resin was constituted of a mixture of two resins. One of the resins was prepared by the cohydrolysis of 55 mol per cent of phenyl methyl silicon dichloride, 15 mol per cent of phenyl silicon trichloride and 30 mol per cent of methyl silicon trichloride. The other resin was prepared by the cohydrolysis of a mixture of equal mol percentages of dimethyl silicon dichloride, methyl silicon trichloride and phenyl silicon trichloride. The two resins were mixed in the proportions of 40% by weight of the first of the above two resins and 60% of the second. A solution was employed which contained 15% by weight of the mixed resin with 0.1% by weight based on siloxane and cobalt of a cobalt paint drier. Such of the pans treated were old pans. These were cleaned with an organic solvent. Some of the pans were new. These were baked to burn off the lubricant which was employed in drawing the pans. The baking was continued until the entire surface of the tinned pans was no longer bright. The pans were then coated with the resin solution by spraying. They were then air dried for 30 to 60 minutes, following which they were baked for one hour at 400 to 450° F. Plain loaf bread was then baked in the pans repeatedly for 100 cycles. The pans were then cleaned and recoated. Perfect release was obtained throughout the 100 cycles.

Bread pans were likewise coated with a similar siloxane resin solution. This solution substituted for the first of the above described resins, a resin prepared as follows: A joint methyl and phenyl Grignard coupling product with silicon tetrachloride was prepared. This preparation was carried out by adding simultaneously an ether solution of methyl magnesium chloride and an ether solution of phenyl magnesium chloride to silicon tetrachloride. The coupling product was stripped of all methyl silicon chlorides and silicon tetrachloride by distillation. The residue from the stripping operation contained 1 mol of phenyl silicon trichloride per 4 mols of phenyl methyl silicon dichloride. To the distillation residue methyl silicon trichloride was added to the extent of 2 mols thereof for every 3 mols of methyl phenyl silicon dichloride. The resin was prepared from the halide mixture by conventional hydrolysis procedure. The results in releasing bread were the same as above described.

The term "bread" herein is employed in its customary sense in the baking industry to refer to loaf bread and does not include pastries or other specialties.

I claim:
1. The method of preparing a bread pan for the baking of bread which comprises coating the internal surfaces of the pan with an organosiloxane resin in which the organic radicals are both alkyl radicals containing less than 4 carbon atoms per radical and phenyl radicals and which resin contains at least 40% of siloxane units of the type $RSiO_{1.5}$ in which R is any of the above defined organic radicals and curing the resin coating by heating the pan at a temperature of at least 350° F. for at least 15 minutes.

2. A metallic cooking implement having a cooking surface consisting of a thin coating of a hardened, nonviscous, high molecular weight alkylated siloxy composition in which a substantial portion of the silicon atoms are attached to two carbon atoms, said coating providing a surface very easily cleaned so long as said coating remains continuously adherent to the metal.

3. A bread pan having a cooking surface consisting of a thin coating of a hardened non-viscous, high molecular weight, alkylated siloxane resin in which a substantial portion of the silicon atoms are attached to two carbon atoms, said coating providing a surface very easily cleaned, so long as said coating remains adhered to the metal.

4. A bread pan having a cooking surface consisting of a thin coating of a hardened high molecular weight polyorganosiloxane resin in which the organic radicals are monovalent hydrocarbon radicals, said radicals being attached to the silicon atoms through silicon to carbon linkages, said coating providing ready release of the baked bread from the pan.

5. A bread pan in accordance with claim 4 in which the organic radicals of the siloxane resin are both methyl and phenyl radicals and in which resin at least 40 per cent of the radicals are of the formula $RSiO_{1.5}$ in which R is selected from the group consisting of methyl and phenyl radicals.

6. The method of preparing a bread pan for the baking of bread which comprises coating the internal surfaces of the pan with an organosiloxane resin in which there are from 0.95 to 1.6 monovalent hydrocarbon radicals per silicon atom, in which resin the siloxane units are selected from the group consisting of $SiO_2$, $RSiO_{1.5}$, $R_2SiO$ and $R_3SiO_{0.5}$, in which units R is a monovalent hydrocarbon radical, and curing the resin by heating.

7. The method of preparing a bread pan for the baking of bread which comprises coating the internal surfaces of the pan with an organosiloxane resin having from 0.95 to 1.6 monovalent hydrocarbon radicals per silicon atom, in which resin the siloxane units are selected from the group consisting of $SiO_2$, $RSiO_{1.5}$, $R_2SiO$ and $R_3SiO_{0.5}$, in which units R is a monovalent hydrocarbon radical, and curing the resin at a temperature of at least 350° F. for at least fifteen minutes.

8. The method of making bread which comprises baking the bread in contact with a supported film of an organosiloxane resin in which there are from 0.95 to 1.6 monovalent hydrocarbon radicals per silicon atom and in which resin the siloxane units are selected from the group consisting of $SiO_2$, $RSiO_{1.5}$, $R_2SiO$ and $R_3SiO_{0.5}$, in which units R is a monovalent hydrocarbon radical, whereby ready release of the baked bread without grease is obtained.

9. The method which comprises coating the internal surfaces of a bread pan with an organosiloxane resin in which there are from 0.95 to 1.6 monovalent hydrocarbon radicals per silicon atom, curing the resin by heating, and repeatedly baking bread in the pan so coated, with the bread in contact with the resin during baking, whereby release of the bread from the pan is obtained without the use of grease, said organosiloxane resin being composed of siloxane units selected from the group consisting of $SiO_2$, $RSiO_{1.5}$, $R_2SiO$ and $R_3SiO_{0.5}$, in which R is a monovalent hydrocarbon radical.

WILLIAM R. COLLINGS.

REFERENCES CITED

The following references are of record in the file of this patent:

UNITED STATES PATENTS

| Number | Name | Date |
| --- | --- | --- |
| Re. 16,431 | Kratzer | Sept. 21, 1926 |
| 1,705,636 | Corby | Mar. 19, 1929 |
| 2,090,617 | Bley | Aug. 24, 1937 |
| 2,439,689 | Hyde | Apr. 13, 1948 |

OTHER REFERENCES

L. Sanderson, British Plastics, Oct. 1946, pp. 459–464.